Oct. 27, 1936.  L. V. FOSTER  2,058,676
TELESCOPE AND PRISM THEREFOR
Filed Jan. 3, 1935
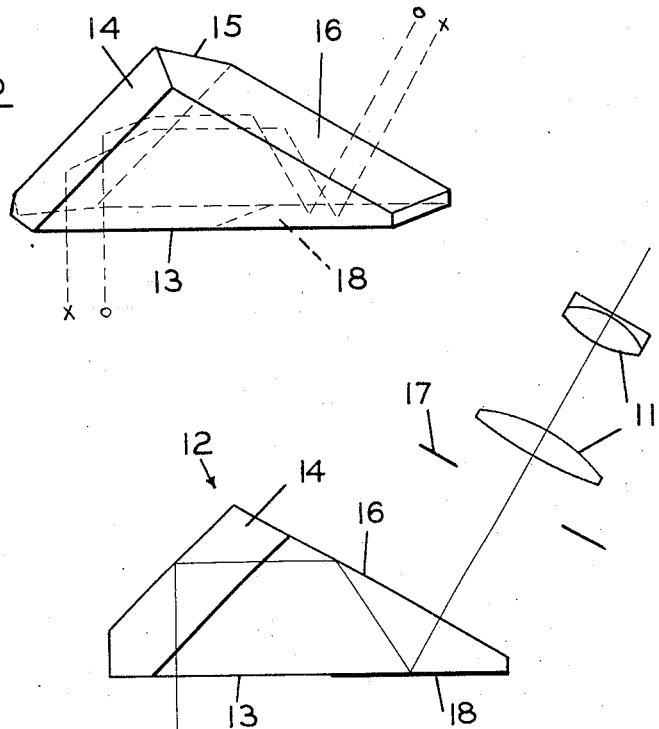
FIG. 2
FIG. 1
LEON V. FOSTER
INVENTOR
BY 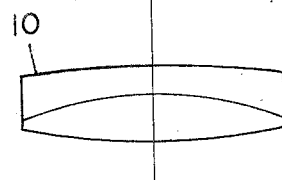
ATTORNEY Patented Oct. 27, 1936

2,058,676

UNITED STATES PATENT OFFICE 2,058,676

TELESCOPE AND PRISM THEREFOR

Leon V. Foster, Irondequoit, N. Y., assignor to Bausch & Lomb Optical Company, Rochester, N. Y., a corporation of New York Application January 3, 1935, Serial No. 252

6 Claims. (Cl. 88—33)

The present invention relates to improvements in telescopes and more particularly has relation to improvements in erect image prism type telescopes having an inclined ocular and to a prism for use therein.

At times it is desirable to have an erect image telescope with the axis of the ocular at an angle to the axis of the objective. Such a telescope can be made by placing between the objective and ocular a prism which will serve both to invert the image and deflect the light rays along the axis of the ocular. Heretofore telescopes have been made embodying such prisms but they have been very costly due to the expense in making the prism or have been of a design limited to a single angular relation between the axis of the objective and the axis of the ocular. The prisms heretofore used have been very costly because it was necessary to grind them with a number of optically flat sides related to each other by angles having very small tolerance limits.

One of the objects of the present invention is to provide a new and improved telescope of the type having an erecting prism and an inclined ocular. Another object is to provide a new and improved form of telescope prism having a roof and only two optically flat surfaces. A further object is to provide a new design for a telescope reversing prism by which a prism can be made with any desired angular deviation. A further object is to provide a new and improved reversing prism which can be relatively easily and inexpensively made from a single block of glass. These and other objects and advantages reside in certain novel features of construction, arrangement and combination of parts as will hereinafter be more fully set forth and pointed out in the appended claims.

Referring to the drawing:

Fig. 1 is a diagrammatic view of a telescope constructed in accordance with my invention.

Fig. 2 is a perspective view of my improved form of prism.

A preferred embodiment of my invention is illustrated in the drawing wherein 10 indicates the objective of a telescope having an ocular 11 with its axis inclined at an angle to the axis of the objective. A reversing prism indicated generally at 12 is formed with an optically flat surface 13 facing the objective 10, perpendicular to the axis of said objective. A roof, comprising the two surfaces 14 and 15, adjoins the surface 13 at such an angle as to reflect the light rays from the objective downwardly to a second optically flat surface 16 which faces the ocular 11 and is perpendicular to the axis thereof. The light is then reflected back to the surface 13 and from there is reflected to the ocular 11 along a line normal to the surface 16. A suitable diaphragm 17 is provided adjacent the ocular.

The prism 12 can be made from a single block of glass and, apart from the roof 14, 15, has only two optically flat surfaces 13 and 16. The angle between the two surfaces 13 and 16 is the same as the angle selected for the inclination of the axis of the ocular and the prism 12 is always located so that the front surface 13 is perpendicular to the objective 10 and the rear face 16 is perpendicular to the ocular 11. As the ray from the objective 10 enters normal to the surface 13 and passes to the objective 11 normal to the surface 16, the necessary angle for the roof 14, 15 can be readily determined. For example, when it is desired to have the axis of the ocular inclined at an angle of 30 degrees to the axis of the objective, the angle between the surfaces 13 and 16 will be 30 degrees and the roof 14, 15 will be disposed at an angle of 45 degrees to the surface 13. In this instance as the light striking the lower part of the surface 13 strikes it at a rather steep angle, about 60 degrees, it is preferable to apply a reflecting layer 18 of silver or the like to the lower part of that surface. When other angles are to be used, any surface which the light strikes at an angle less than the critical angle is silvered.

The foregoing specific angles are given merely by way of example since the prism can be made for any desired acute angular deviation. Apart from the advantages in manufacture accruing from this type of prism, the fact that, apart from the roof, there are only two reflecting surfaces and a relatively short glass path, reduces the loss of light and gives a brighter image than the prisms heretofore used.

From the foregoing it is apparent that I have been able to attain the objects of my invention and provide a new and improved telescope having an inclined eye piece and a reversing and deviating prism which is efficient in operation yet relatively simple and inexpensive to manufacture. Various modifications can of course be made without departing from the spirit of my invention or the scope of the appended claims.

I claim:

1. An erecting prism for a telescope having the axis of the ocular related to the axis of the objective at an angle, said prism having two flat surfaces intersecting at said angle and a roof positioned at such an angle that light entering the prism normal to one flat surface will be reflected in succession by said roof and each of said flat surfaces, and will leave the prism normal to the other.

2. In a telescope having an objective and an ocular the axes of which are angularly related, a reversing prism disposed between said objective and said ocular, said prism having a flat front face, a roof for receiving light directly from said objective through said flat front face, a flat rear face for receiving light from said roof and reflecting it to said flat front face, said flat front face reflecting the light to said ocular through said rear face.

3. A telescope comprising an objective, an ocular having its axis disposed at an angle to the axis of the objective, and a prism located between said objective and said ocular, said prism having a flat face perpendicular to the axis of said objective, a second flat face perpendicular to said ocular and a roof for receiving the light directly from said objective and directing it to said second face, said second face reflecting the light to the first flat face from which the light passes to the ocular.

4. A telescope comprising an objective, an ocular spaced from said objective and positioned with its axis at an angle of 30 degrees to the axis of the objective, and a prism located between said objective and said ocular, said prism having a flat light receiving surface facing the objective and perpendicular to the axis thereof, a roof located on the axis of the objective and at an angle of 45 degrees thereto and a flat exit surface perpendicular to the axis of the ocular.

5. A telescope comprising an objective, an ocular spaced from said objective and positioned with its axis at an angle of 30 degrees to the axis of the objective, and a prism located between said objective and said ocular, said prism having a flat light receiving surface facing the objective and perpendicular to the axis thereof, a roof located on the axis of the objective and at an angle of 45 degrees thereto and a flat exit surface perpendicular to the axis of the ocular, the light receiving surface being silvered opposite said exit surface.

6. A reversing prism for deviating an image through a small angle, said prism having a plane front face normal to the incoming light, a roof receiving the incoming light directly for directing said light to a second plane face so arranged as to reflect the light to said front face from which the light is reflected outwardly normal to said second plane face.

LEON V. FOSTER.